(12) United States Patent
Gutelzon et al.

(10) Patent No.: US 9,135,518 B2
(45) Date of Patent: *Sep. 15, 2015

(54) ROBUST AND EFFICIENT IMAGE IDENTIFICATION

(71) Applicant: PicScout (Israel) LTD., Herzlia Pituach (IL)

(72) Inventors: Offir Gutelzon, Herzlia (IL); Uri Lavi, Netanya (IL); Ido Omer, Medina, WA (US); Yael Shor, Tel-Aviv (IL); Simon Bar, Tel-Aviv (IL); Golan Pundak, Tel-Aviv (IL)

(73) Assignee: PicScout (Israel) LTD., Herzlia Pituach (IL)

( * ) Notice: Subject to any disclaimer, the term of this patent is extended or adjusted under 35 U.S.C. 154(b) by 59 days.

This patent is subject to a terminal disclaimer.

(21) Appl. No.: 13/943,705

(22) Filed: Jul. 16, 2013

(65) Prior Publication Data

US 2013/0301931 A1    Nov. 14, 2013

Related U.S. Application Data

(63) Continuation of application No. 12/978,687, filed on Dec. 27, 2010, now Pat. No. 8,488,883.

(60) Provisional application No. 61/282,189, filed on Dec. 28, 2009.

(51) Int. Cl.
*G06K 9/46*      (2006.01)
*G06F 17/30*    (2006.01)
*G06K 9/62*      (2006.01)

(52) U.S. Cl.
CPC ........ *G06K 9/4638* (2013.01); *G06F 17/30259* (2013.01); *G06K 9/4671* (2013.01); *G06K 9/6212* (2013.01)

(58) Field of Classification Search
CPC ..... G06K 9/00; G06K 9/4638; G06K 9/4671; G06K 9/6212; G06K 9/6202; G06K 2009/6213; G06F 17/30259
USPC ........................................ 382/176, 190, 201
See application file for complete search history.

(56) References Cited

U.S. PATENT DOCUMENTS

| | | | |
|---|---|---|---|
| 5,913,205 | A | 6/1999 | Jain et al. |
| 5,915,250 | A | 6/1999 | Jain et al. |
| 5,930,783 | A | 7/1999 | Li et al. |

(Continued)

OTHER PUBLICATIONS

Notice of Allowance for U.S. Appl. No. 12/978,687, Mail Date Apr. 23, 2013, 9 pages.

(Continued)

*Primary Examiner* — Sheela Chawan
(74) *Attorney, Agent, or Firm* — Perkins Coie LLP

(57) ABSTRACT

Apparatus for matching a query image against a catalog of images, comprises: a feature extraction unit operative for extracting principle features from said query image; a relationship unit operative for establishing relationships between a given principle feature and other features in the image, and adding said relationships as relationship information alongside said principle features; and a first comparison unit operative for comparing principle features and associated relationship information of said query image with principle features and associated relationship information of images of said catalog to find candidate matches.

20 Claims, 15 Drawing Sheets

(56) References Cited

U.S. PATENT DOCUMENTS

| | | |
|---|---|---|
| 6,035,055 A | 3/2000 | Wang et al. |
| 6,047,085 A | 4/2000 | Sato et al. |
| 6,763,148 B1 | 7/2004 | Sternberg et al. |
| 7,474,759 B2 | 1/2009 | Sternberg et al. |
| 8,488,883 B2 * | 7/2013 | Gutelzon et al. ............ 382/176 |
| 2007/0009159 A1 | 1/2007 | Fan |
| 2010/0241650 A1 | 9/2010 | Chittar |

OTHER PUBLICATIONS

Non-Final Office Action for U.S. Appl. No. 12/978,687, Mail Date Oct. 15, 2012, 11 pages.

* cited by examiner

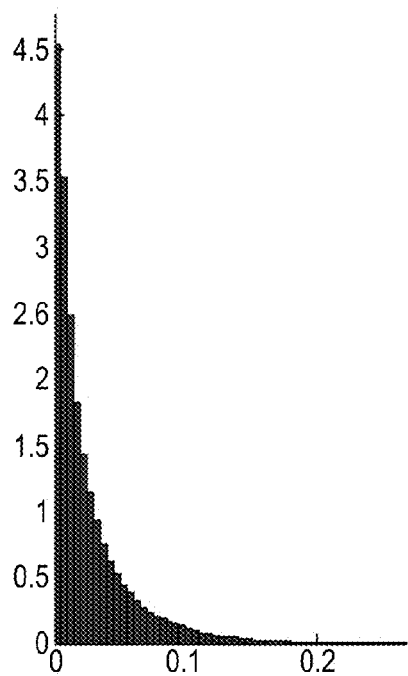
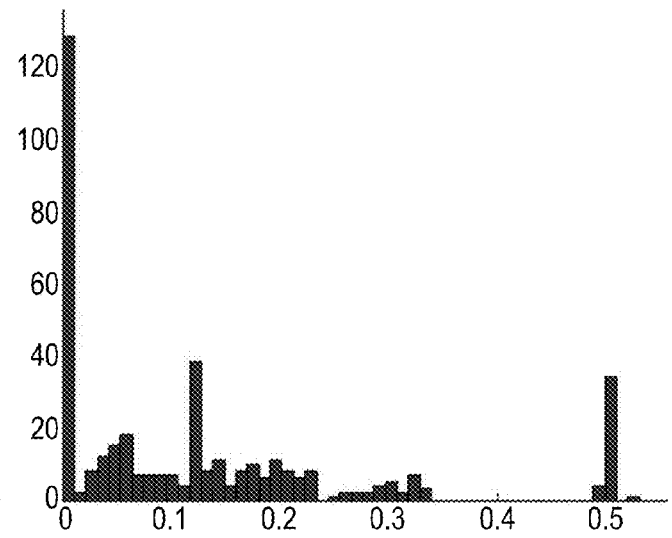
FIG. 8A          FIG. 8B
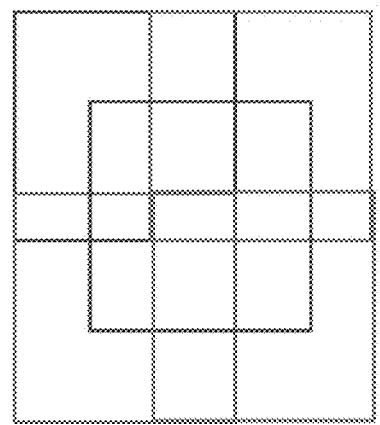
FIG. 9

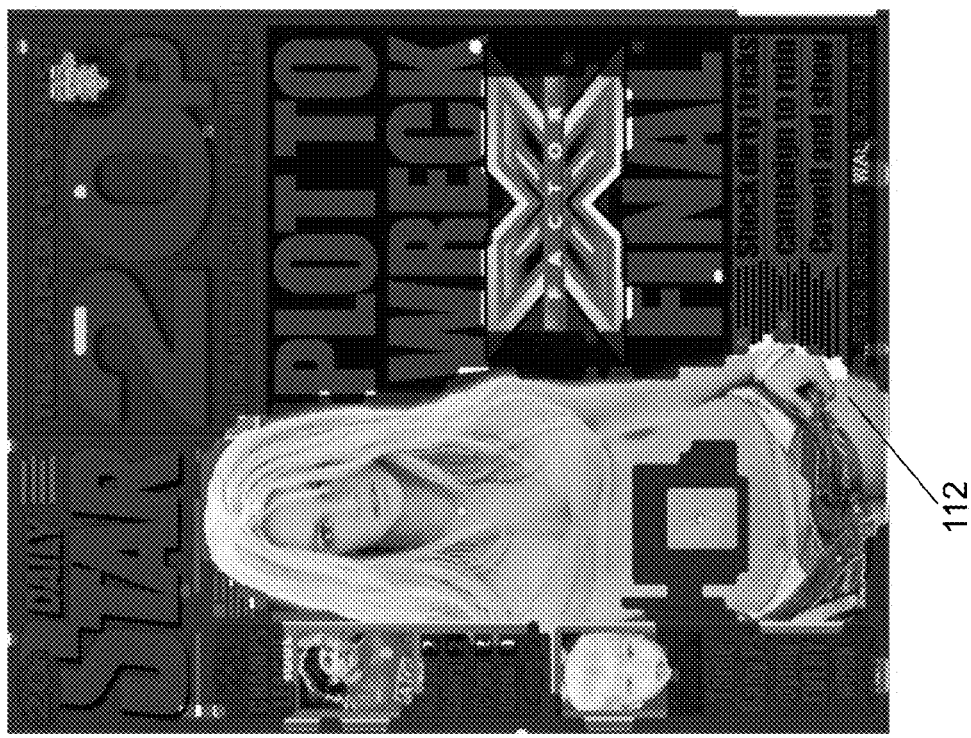
FIG. 11

142
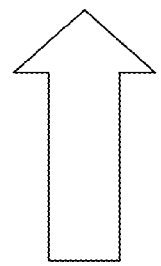
140
FIG. 14

ROBUST AND EFFICIENT IMAGE IDENTIFICATION

CROSS-REFERENCE TO RELATED APPLICATION(S)

This application is a continuation application of U.S. patent application Ser. No. 12/978,687, filed Dec. 27, 2010, entitled "ROBUST AND EFFICIENT IMAGE IDENTIFICATION", which claims the benefit of priority under 35 U.S.C. §119(e) of U.S. Provisional Patent Application No. 61/282,189, filed Dec. 28, 2009, entitled "ROBUST AND EFFICIENT IMAGE IDENTIFICATION", all of the contents of which are incorporated herein by reference in their entireties.

TECHNICAL FIELD

The present invention relates to a device and method for robust and efficient image identification and, more particularly, but not exclusively to an efficient way to allow rights holders in images to identify usage of their images.

BACKGROUND

The Internet has professional image banks which provide images for use. These images are often marked, either openly or steganographically, so that their use can be monitored and charged for. Furthermore unauthorized use can be identified. Aside from professional image banks, many rights holders post images on the Internet whose further distribution they would like to control.

While some protection is provided when images are copied and used directly, most image protection systems fail because their protection scheme can be easily removed from the image or can be easily broken if an image is cropped or partially modified. In addition, there is no known protection system if say the image is printed and then scanned back into a new digital image. Furthermore images provided by newspapers or magazines may also be scanned and then posted on the Internet.

Thus some image comparison systems are provided which are able to match an image for different versions of the same image. However these systems are also not very good at finding redigitized versions of images, and are particularly vulnerable if the image has been cropped, flipped, rotated, the color balance has been changed and/or if other distortions have been applied.

Aside from identifying usage of an image for control or charging purposes, it is also desirable to be able to find images to monitor popularity, for marketing, or for numerous other purposes

SUMMARY

The present embodiments may overcome the above outlined problems by providing an image comparison apparatus and method that is substantially resilient to scanning, scaling, rotating, cropping or other distortions of an image.

According to one aspect of the present invention there is provided apparatus for matching a query image against a catalog of images, comprising:

a feature extraction unit operative for extracting principle features from said query image;
a relationship unit operative for establishing relationships between a given principle feature and other features in the image, and adding said relationships as relationship information alongside said principle features; and
a first comparison unit operative for comparing principle features and associated relationship information of said query image with principle features and associated relationship information of images of said catalog to find candidate matches.

In an embodiment, said feature extraction unit is operative to select said principle features based on points of said image normalized using eigen values.

In an embodiment, said feature extraction unit is operative to find said features in blurred level and scaled octave versions of the image.

In an embodiment, said relationships are intensities in parts of the image surrounding the principle feature.

In an embodiment, said relationships comprise relative sizes.

In an embodiment, said relationships are stored in a multi-dimensional vector.

An embodiment may comprise a second comparison unit operative to compare said query image with said candidate matches to find a nearest neighbour.

In an embodiment, said second comparison unit is operative to find said nearest neighbour by calculating a transform between said query image and a candidate match.

In an embodiment, said second comparison unit is operative to find said nearest neighbour using a Hamming distance.

An embodiment may comprise a masking unit prior to said feature extraction unit, said masking unit distinguishing between a Laplacian distribution as characterizing image areas and a sparse distribution characterizing text areas, and masking out said text areas.

In an embodiment, said feature extractor is operative to obtain said principle features by extracting features from an image and normalizing said extracted features to a set of a predetermined size based on a size of an associated eigen value.

In an embodiment, said relationship unit is operative to store said relationship information as a multi-dimensional vector associated with said given principle feature.

In an embodiment, said first comparison unit is operative to compare all relationship information of a given principle feature of a query image with a subset of relationship information of a principle feature of a catalogue image, thereby to allow recognition of said query image even when said query image is a cropped version of said catalogue image.

In an embodiment, said relationship unit is configured to divide an image part around a principle feature into overlapping patches, each patch being associated with separate relationship information.

According to a second aspect of the present invention there is provided a method for matching a query image against a catalog of images, using an electronic computer programmed for:

extracting principle features from said query image;
establishing relationships between a given principle feature and other features in the image, and adding said relationships as relationship information alongside said principle features; and
comparing principle features and associated relationship information of said query image with principle features and associated relationship information of images of said catalog to find candidate matches.

In an embodiment, said relationships are intensities in parts of the image surrounding the principle feature.

In an embodiment, said relationships comprise relative distances.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a simplified diagram illustrating a first device according to the present embodiments showing apparatus for describing an image in a way independent of specified distortions, according to a first embodiment of the present invention;

FIG. 2 is a simplified diagram of apparatus for comparing two images on the basis of the description provided by the embodiment of FIG. 1;

FIG. 3 is a simplified flow diagram illustrating a procedure of offline learning for setting up image descriptions for the description space thus an all possible descriptions world) according to an embodiment of the present invention;

FIG. 4 is a simplified flow diagram illustrating a procedure for extracting feature points and creating descriptors according to an embodiment of the present invention;

FIG. 5 is a simplified flow diagram illustrating a variation of the FIG. 4 procedure for extracting feature points and creating descriptors according to an embodiment of the present invention, for printed and digitalized images;

FIG. 6 is a simplified flow chart illustrating feature comparison to obtain a candidate set by voting followed by full search of the candidate set to find a match, according to an embodiment of the present invention;

FIG. 7 is a simplified flow diagram illustrating batch processing of catalogue images according to an embodiment of the present invention, in which batch approach is allowed by the system configuration;

FIG. 8a is a simplified diagram showing a distribution of edges indicative of an image region, in order to isolate images from surrounding text according to an embodiment of the present invention;

FIG. 8b is a simplified diagram showing a distribution of a text or graphic region, for exclusion from an image prior to comparison, according to an embodiment of the present invention;

FIG. 9 is a simplified diagram illustrating the dividing of an area surrounding a principle feature into overlapping patches for descriptor analysis according to an embodiment of the present invention;

FIG. 10 illustrates an image passing through four stages of fast Fourier transform (FFT) processing in order to remove periodic noise according to an embodiment of the present invention;

Figure 12:
Figure 13:
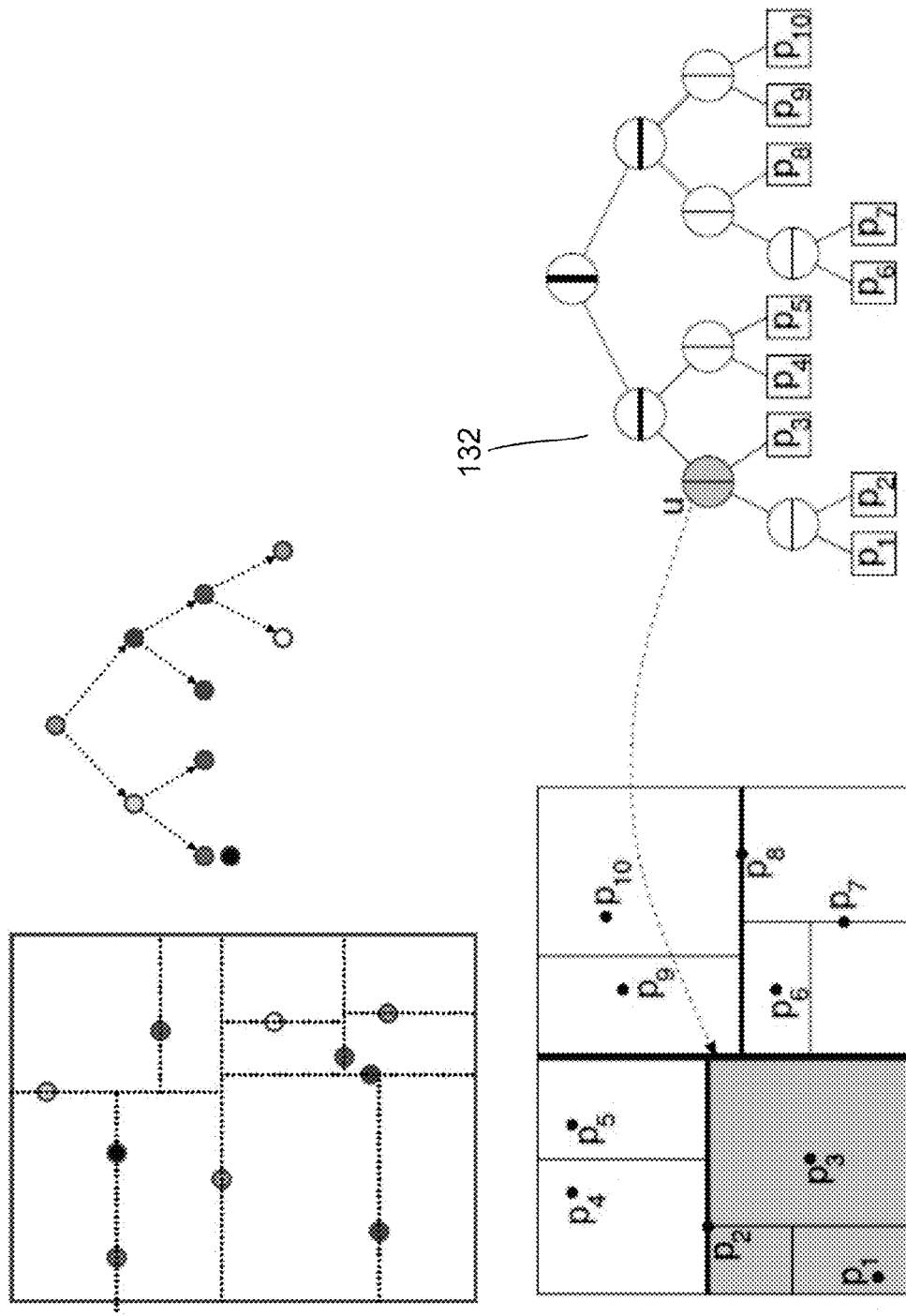
Figure 15:
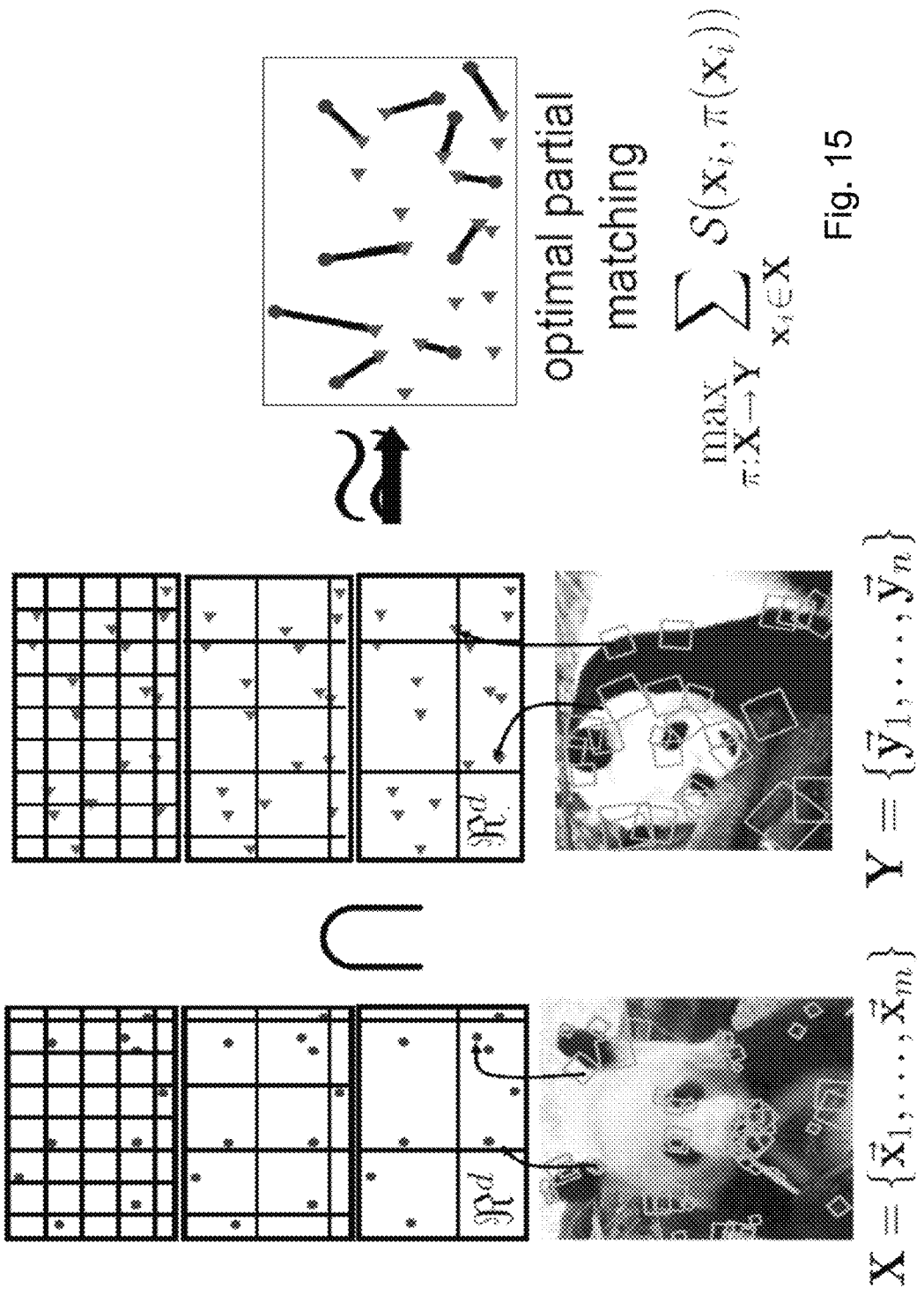
Figure 16:
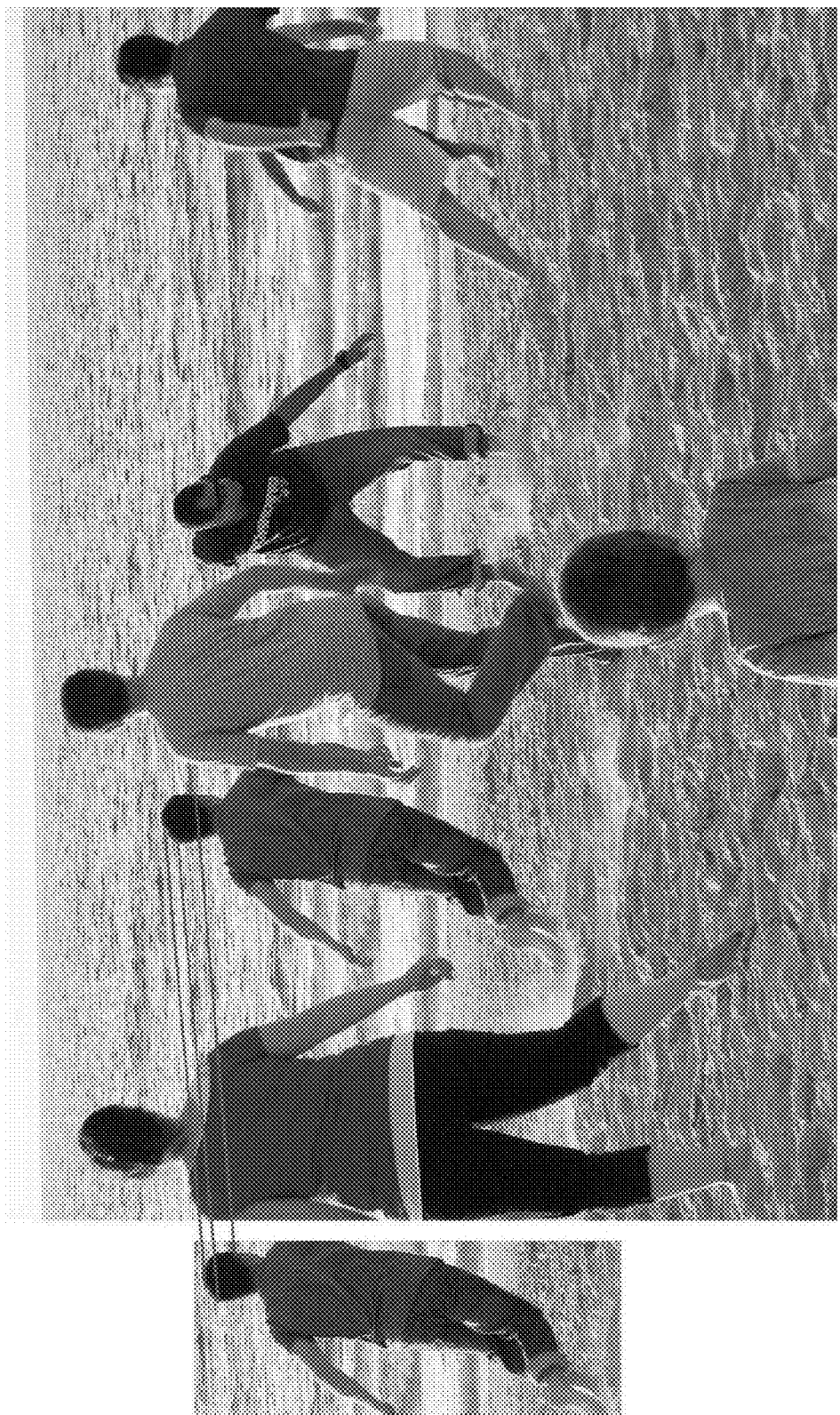
Figure 17:
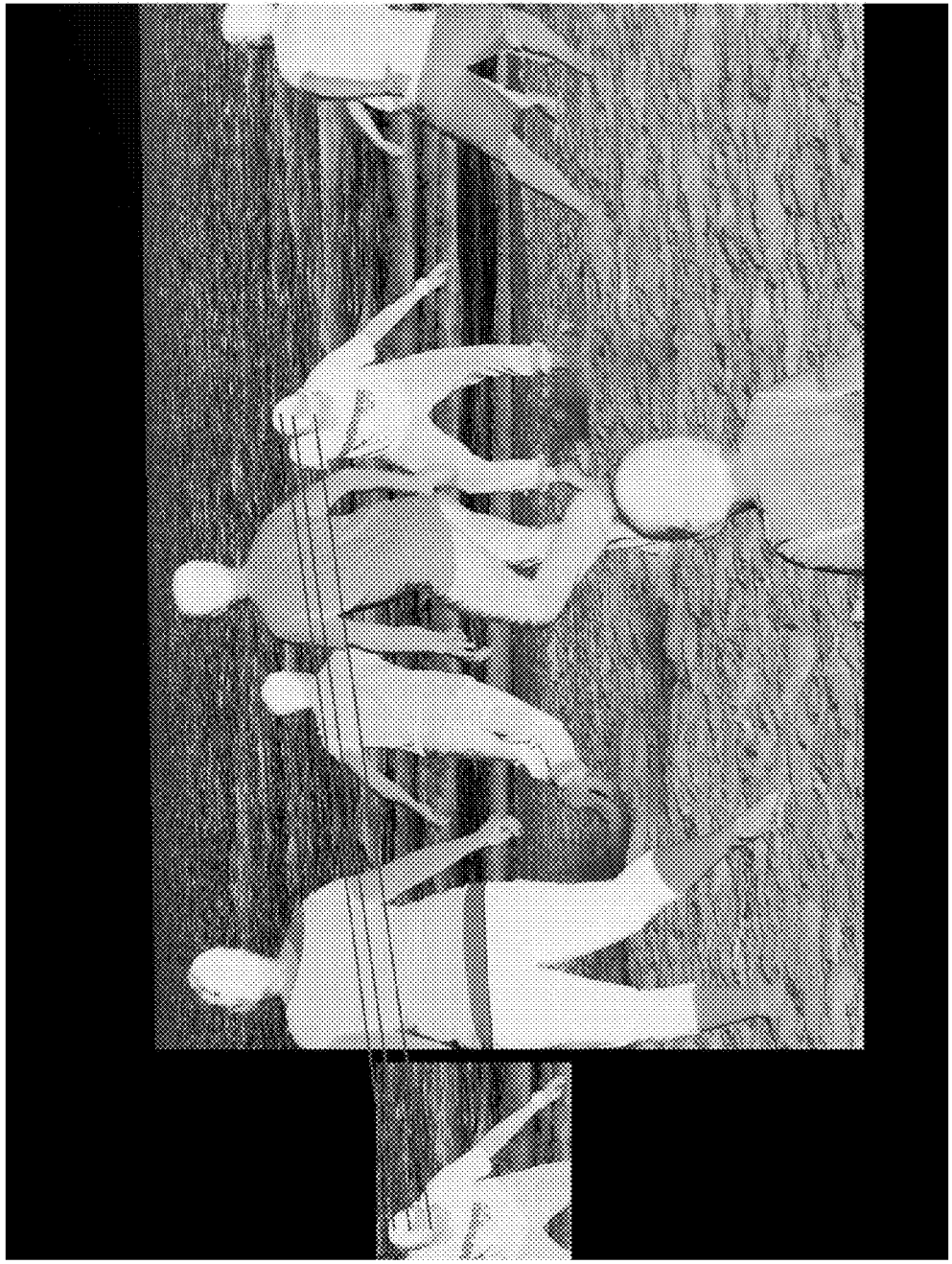

FIG. 11 illustrates a sheet of newspaper comprising a mixture of text and image matter, and showing masking of the text matter to leave the image matter according to an embodiment of the present invention;

FIG. 12 illustrates a sheet of newspaper in which separate sub-images are identified, according to an embodiment of the present invention;

FIG. 13 illustrates an unevenly distributed feature space and a corresponding kd tree according to an embodiment of the present invention, to be applied when non batch operations are required;

FIG. 14 illustrates a sheet of newspaper on which masking is used to isolate skin areas, according to an embodiment of the present invention;

FIG. 15 illustrates cropped and otherwise distorted images being matched using partial matching with source images according to an embodiment of the present invention;

FIG. 16 illustrates a cropped image being matched with a source image according to an embodiment of the present invention; and FIG. 17 shows a further simplified example of feature matching to find a source image from a cropped and color negated image according to an embodiment of the present invention.

DETAILED DESCRIPTION

The present embodiments allow comparisons between images which comparisons are resilient to scanning, scaling, rotating, cropping and other distortions of the image.

The embodiments may operate in a three stage process. An initial stage involves finding distinctive features of the image, or for that matter any list of significant features, and an electronic signature is constructed of the selected features, for example a k dimensional vector may be constructed describing interrelationships, distances or intensities in the region about the feature. A non-limiting example for k may be twenty.

In a second stage a fast match is made of a target, or query, image to images available over a network based on the electronic signature and a distance measure to produce a list of candidates having M shortest distances to the vector. A non-limiting example of M may be a hundred.

Finally, a filtering matching is then carried out, for example using transformations (RanSac) and Hamming distance, to select between the candidates, finding either a best candidate or no candidate at all, if the closest distance is still above a preset threshold.

Some embodiments support cropping, in which case the target image may be a mere subset or a superset of an image retrieved from the network. Such a circumstance is catered for by using an unordered set of descriptors. Then the image comparison is based taken the point of view of some given feature and testing whether its surroundings are correct.

In principle this would lead to large numbers of searches for each image, and as will be discussed below, certain embodiments cater for this issue. For example, in a feature vector of 126 points, an embodiment may avoid checking all the points, instead identifying and checking certain strongest points.

An embodiment may check a catalogue, say of an image bank, with source images appearing on the Internet that may be cropped, scaled, scanned or otherwise include distortions.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
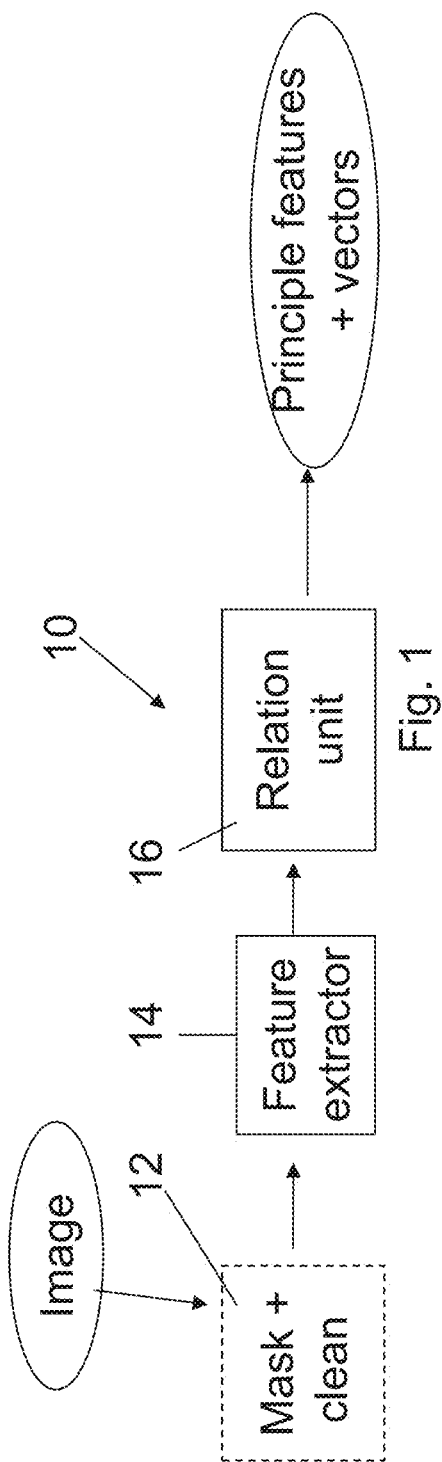

Reference is now made to FIG. 1 which illustrates an image processing part 10 of an apparatus for matching a query image against a catalogue of images, according to a first embodiment of the present invention. The image processing unit 10 sintended to break down an image patch into a series of principle features and relationships around the principle features or interrelationships between them.

A mask and clean unit 12 masks out irrelevant parts of an image such as text regions, masks in areas of particular interest such as skin tone regions and cleans out noise, say from scanning. The mask and clean unit 12 is shown in hashed lines as it is not required for previously digitized clean images such as are generally contained in an on-line editorial catalogue. Rather it is generally used for the query images.

More particularly, the masking unit 12 masks out text areas from the image itself by distinguishing between a Laplacian distribution that characterizes image areas and a sparse distribution that characterizes text areas. The text areas are masked out, as discussed below.

A feature extraction unit 14 then extracts principle features from the query image. As will be explained below features are extracted from the image and then a set of a preset size of most significant ones of the features are retained.

In an embodiment, the feature extractor 14 may obtain principle features by extracting features from an image and reducing the extracted features to a set of a predetermined size based on a size of an associated eigen value.

A relationship unit 16 then takes each feature of the retained set and establishes relative distances between the given principle feature and surrounding features such as surrounding intensities. A vector made up of the relative or normalized distances or intensities or other measures of the surrounding features is then added as relationship information alongside the particular principle feature. The vector is multi-dimensional. Thus the image is now converted into a description based on feature points and relative geometry. The description is independent of any absolute size or coloring or scaling or cropping and thus can be used to search for different versions of the same image despite color distortion, noise, stretching, rotation, flip, cropping and compositing with another image, provided that both the query and all target images are described in the same way.

Figure 2:
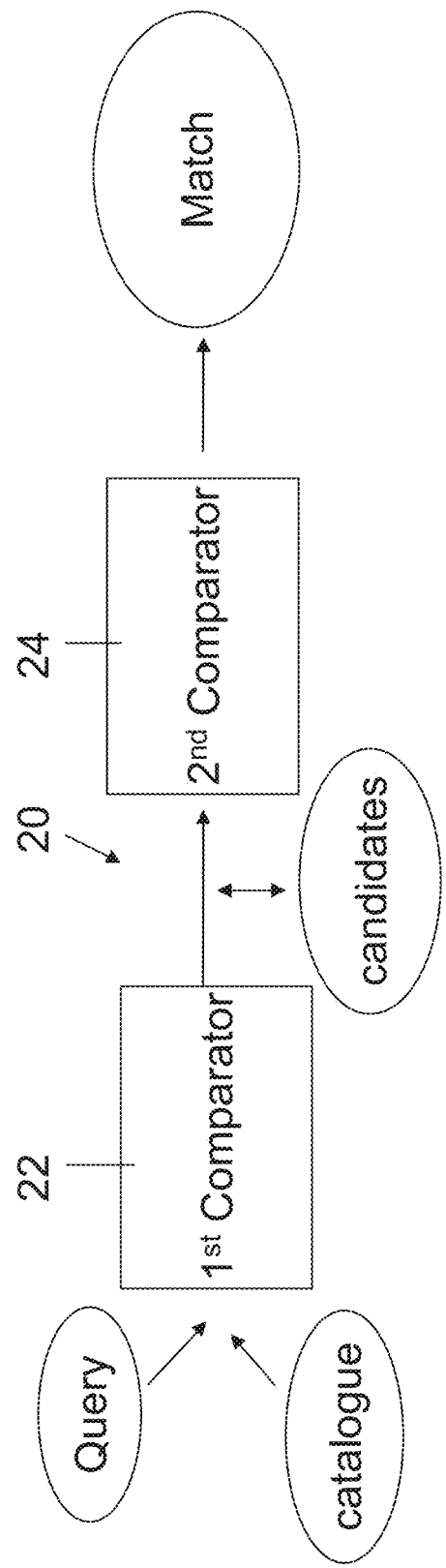

FIG. 2 illustrates a two stage comparison unit 20 of the apparatus for matching a query image against a catalogue of images, according to a first embodiment of the present invention. The apparatus comprises a first comparison unit 22 which compares principle features and associated relationship information of a query image with principle features and associated relationship information of images of a catalog to find candidate matches. The comparator uses distance measures and takes principle features of the query image in turn. For each principle feature it tests the vectors of the relationship information against the vectors of the catalogue image. If the relationships look the same for several principle features then the current catalogue image is clearly a candidate match and is added to a candidate set. The comparison is discussed in greater detail hereinbelow.

A second comparison unit 24 then carries out a full comparison of the query image with each of the candidate matches to find a nearest match, for example based on the transformation needed between the two images and verification method, like Hamming distance between selected features. Provided that the Hamming distance or transformation is below a preset threshold, the nearest neighbour is regarded as a match.

An embodiment deals with the case where the query image is a cropped version, that is to say a subset, of the image found in the catalogue. In general cropped parts of images are usually the interesting parts of images so it would be expected that many of the principle features and relationships will be preserved. However some of the features will be missing. In this case the first comparison unit 22 may compare all relationship information of a given principle feature of the query image with just a subset of the corresponding information of the catalogue image, so that nearness is recognized despite certain features being missing.

In general, catalogue images are processed ahead of time, and query images are processed in real time for the search. Query images may be images initially in electronic form, say in the Internet or may be images that have been found in a printed publication and require scanning.

The embodiments are now considered in greater detail. Matches are sought between near exact images, images that are considered to be derived from the original image, including a subset or a superset. The image may have been through changes such as color distortion, noise, stretching, rotation, flip, cropping and compositing with another image. Such distortions are referred to as distortions in the image plane.

An embodiment, known as a tracker, finds matches between images from the web and images from a given catalogue. A further embodiment, referred to as an Editorial Monitoring unit or EM, finds matches between images from scanned magazines, newspapers or web dynamic content dealing with news, sport and entertainment.

Figure 3:
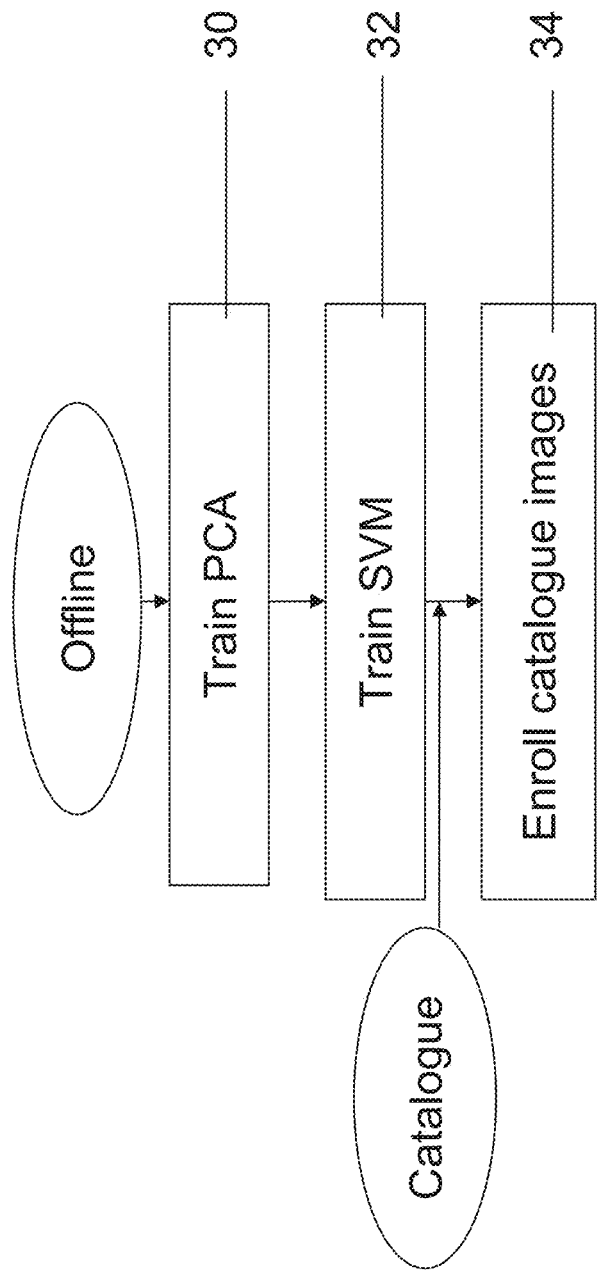

Reference is now made to FIG. 3, which illustrates a general process according to the present invention. In the general process an offline part begins with a training process 30 for training an algorithm to find principle components. The process is denoted "train PCA". PCA train or principal component analysis training, is used in order to find a projection of image patches onto an eigen-space which preserves most of the patch's variance.

A second stage 32 involves training of a support vector machine algorithm to separate between statistics of text/image regions.

Support vector machines (SVMs) are a set of related supervised learning methods used for classification and regression. A support vector machine constructs a hyperplane or set of hyperplanes in a high or infinite dimensional space, which can be used for classification, regression or other tasks. Intuitively, a good separation is achieved by the hyperplane that has the largest distance to the nearest training datapoints of any class, a so-called functional margin, since in general the larger the margin the lower the generalization error of the classifier.

Now that training is completed the apparatus is ready to work on the catalogue images.

Figure 4:
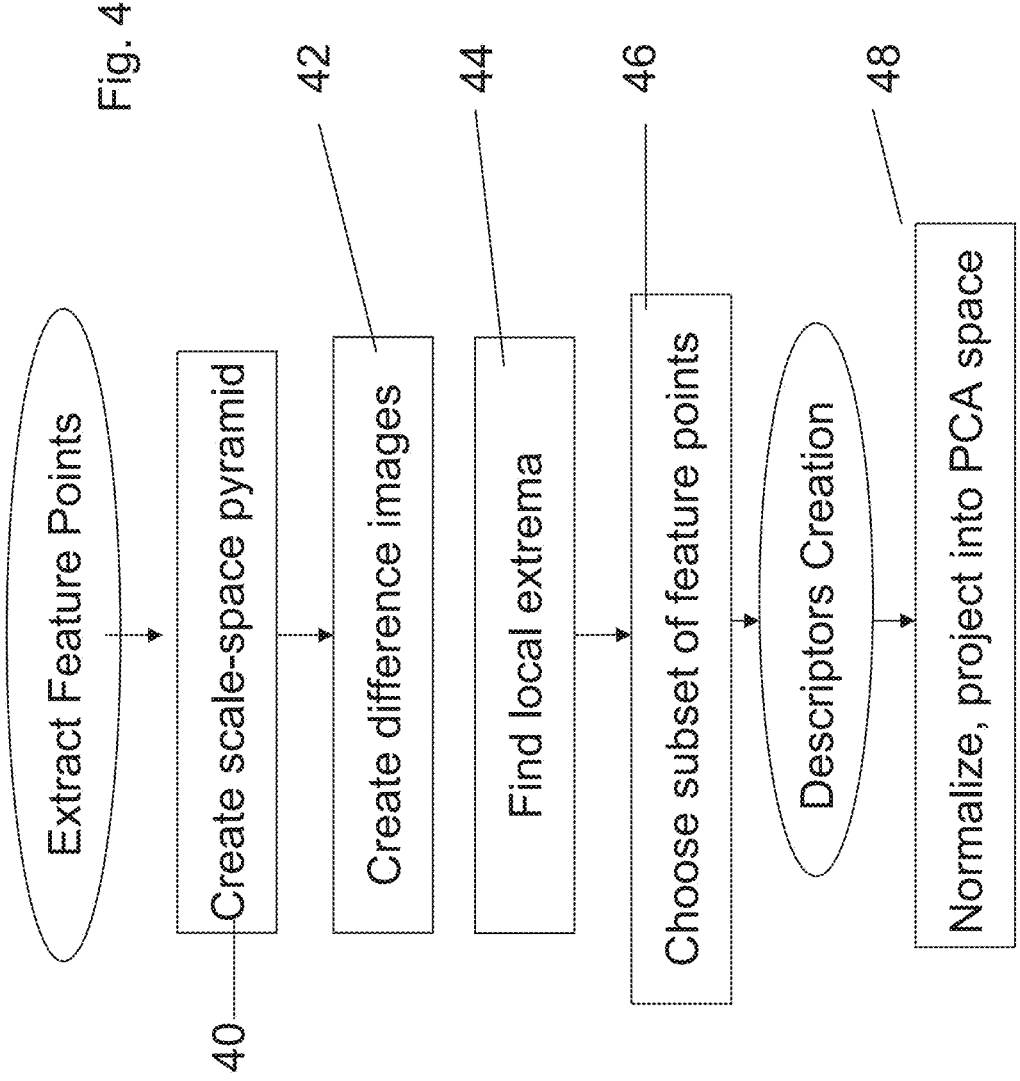

The catalogue is provided and the individual catalogue images are enrolled 34, to obtain a subset of feature points, and then to create descriptors The enrollment stage is illustrated in FIG. 4.

Feature-points extraction, comprises creating a scale-space pyramid 40, creating difference images 42, finding local extrema, 44 and then choosing a subset of the feature points 46. Generally the subset includes those feature points whose subtraction makes the biggest difference to the image.

Once the principle features have been selected then stage 48 obtains the associated descriptors vector. The distances between features are normalized, and intensity values are projected into the PCA space. The above may typically have been calculated in the Train PCA stage.

Figure 5:
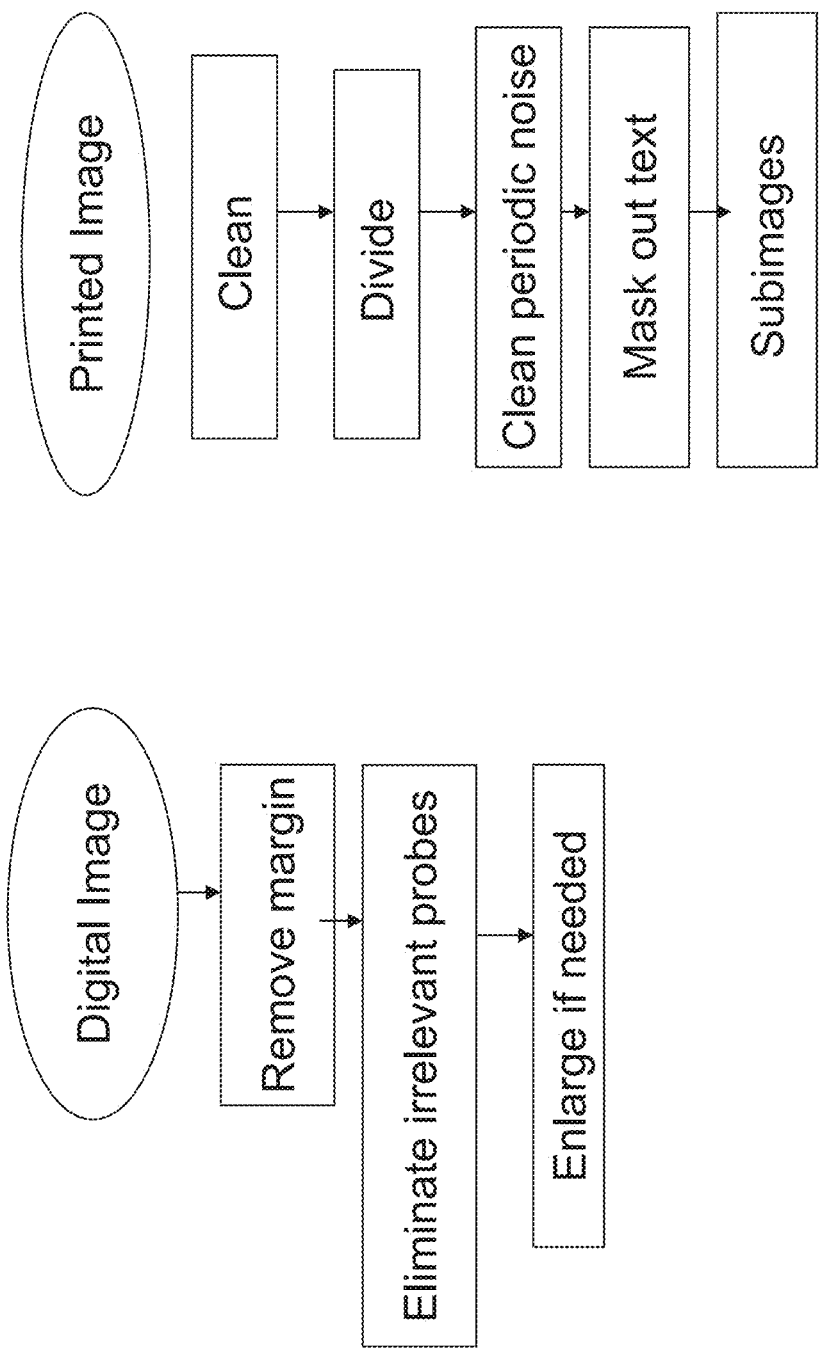

Reference is now made to FIG. 5, which illustrates the initial procedure at the mask and clean unit 12 for a new query image. Each new query image is either a digital image or a printed/scanned image. In the case of a printed image it is initially scanned or photographed (i.e. digitalized back). Then it is cleaned of flaws and the like and divided into sub-images. Periodical noise is then cleaned. This is typically artifacts introduced by scanning or printing. A text vs. Image mask is created and then there is a second opportunity to divide the image in to sub-images. If the image is initially digital, that is to say the query image (is something that was posted on the web or photographed from a camera and a like), then we remove the margin, eliminate irrelevant probes, and enlarge as necessary.

Figure 6:
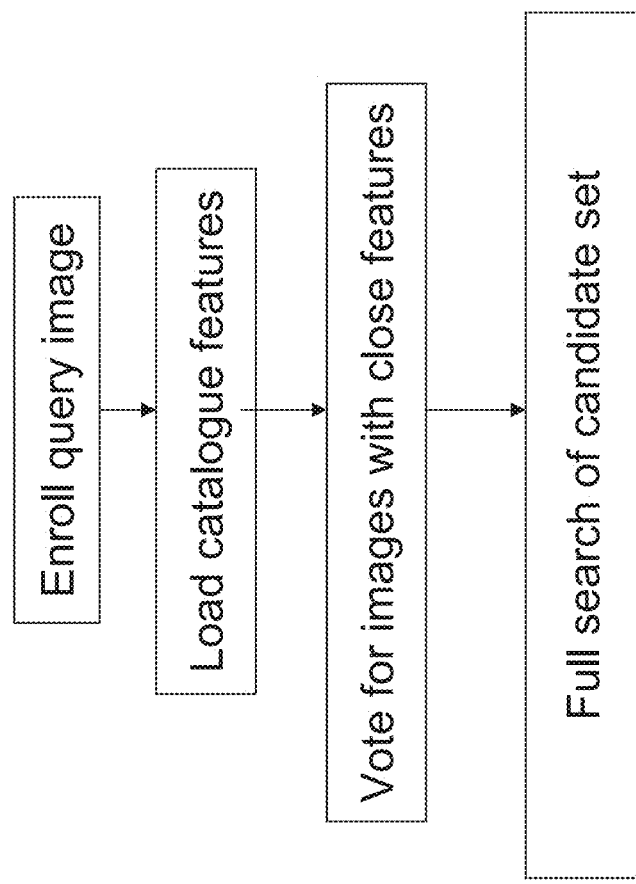

Referring now to FIG. 6, the query image is now enrolled, which provides features (also based on the relationship information).

A search is carried out against the catalogue to find possible candidates for a match. This requires loading catalogue features into a features space table, or kd-tree or other index structure. Then, using the table or tree, the algorithm votes for images with close features to find a set of candidate images. In a second comparison stage, all features of the candidate images are compared with the query image to find a closest neighbour.

The second comparison stage may use any one of a number of methods known in the art, for example it may calculate transformation, say using the random sample consensus algorithm, referred to as RANSAC. Alternatively it may use fast template matching based on a Hamming distance, or advanced false matches elimination.

A verification stage then rejects certain matches, based on unlikely distributions of the features matched. Thus if the features matched are all found to be within a small region, or all on the same ridge or edge, or none on a skin region, the match may be rejected. The verification stage is highly configurable based on inputs to the process.

Figure 7:
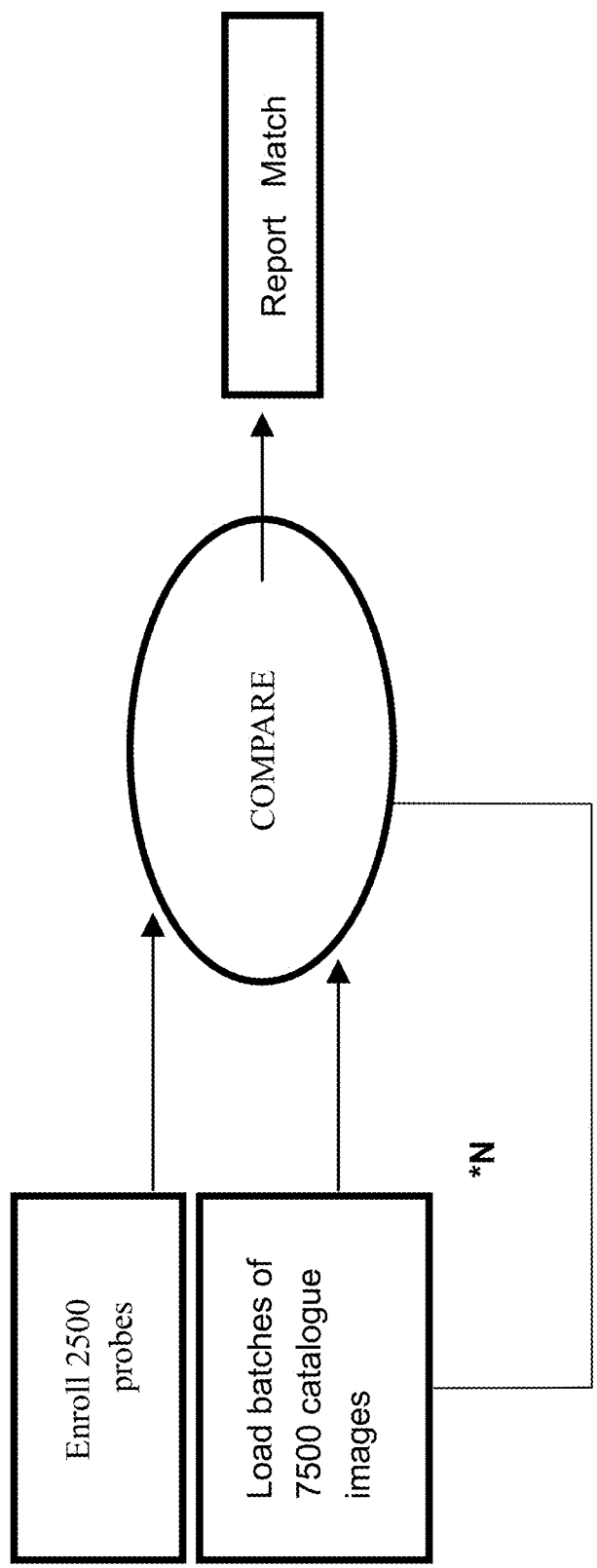

Reference is now made to FIG. 7, which illustrates a global process for batch searching for matching against query images. In the prototype system, the query process is carried out by batching the query or probe images. Each batch consists of ~2500 probes images which are enrolled. One by one they are compared to a batch of 7500 catalogue images loaded into a table/kd-tree. Matches are reported and then a new 7500 images batch is loaded into the table or tree. The same probes are now compared to the new batch and matches reported and removed. Then another 7500 image batch is loaded and so on until the end of the catalogue is reached. By the end of the work the 2500 probes are being compared to all the catalogue images. During non batch operations a probe is compared against one- or several tables/k-d trees. Other index structures may be considered by the skilled person.

Considering now the above processes in greater detail, we return to FIG. 3 and the offline part of the process. In stage 30, "Train PCA", principle component analysis is used to find a basis of low dimension onto which it is possible to project the vector descriptors, in order to create a compact representation. The projection is made from a high-dimensional space into a low-dimensional space such that the distance relationships between vectors are preserved. The projection is computed by finding an orthogonal coordinate system in which the training samples have the biggest variance.

Moving on to stage 32, in a further training process SVM is used to learn the division between continuous-tone areas and text-graphics areas. Each training patch is described by the statistics of its edges and by its gray-level intensities. Referring now to FIG. 8, the training process takes into consideration the fact that the distribution of the edges in a continuous-tone image is a laplacian distribution, such as shown in FIG. 8a. By contrast a text/graphics region gives a sparse distribution as shown in FIG. 8b. Although a clear difference in distribution is apparent between FIGS. 8a and 8b, other cases may be more borderline, and SVM provides a hyperplane through machine learning which provides a line of demarcation.

Returning again to FIG. 3 and in stage 34, enrollment, each catalogue image is considered. For each image a process of taking N feature points is carried out, and for each feature point a K dimensional vector is created as its descriptor. A non-limiting example for N is 256.

The process of feature point extraction is shown in FIG. 4. The idea is to obtain feature points that are easy to extract and are likely to remain stable over transformations. Feature extraction is carried out using Low's difference of Gaussian robust and efficient detector, an algorithm that consists of the following initial stages:

Create a scale-space pyramid—stage 40. This stage creates a series of blurred level and scaled octave versions of the image. The blurring is done using a Gaussian filter. This is followed by stage 42, of creating Difference or Laplacian images. For each octave and level the stage creates the Laplacian image or the difference of Gaussian image, or at least an approximation thereof.

In stage 44, local extrema are found and localized. In this stage, of finding feature points, the local maxima/minima in the laplacian of the scale-space pyramid which are above a certain intensity, to avoid low contrast, are found and then localized to sub-pixel accuracy. Those local maxima represents what may be termed blobs in the image at a certain scale and can be found in the image also after it has been distorted.

Stage 46 involves selecting a subset of the feature points. The above algorithm will generally have found thousands of feature points in stage 44. To improve computability the number of feature points may be reduced, for example to N. We choose the strongest points, for example based on strong intensity in the laplace image or strong gradient. The gradient may be determined using all of the levels and octaves, to give a wide distribution over the image. The highest gradients may be found using a greedy algorithm that takes into consideration the point's intensity and their spatial distance.

Stage 48 involves creation of descriptors. For each feature point a descriptor is created. The descriptor may be a vector of the normalized intensity values of the patch around the feature point in the relevant octave and level, resized to a constant size and projected onto the K-PCA basis which was computed in advance. The size of the initial patch is a by-product of the octave in which it was found. A descriptor as provided above is optimized for the distortions likely to be encountered in matching between different copies of the same image, thus illumination, color, noise, blur and some linear transformations. In particular it is noted that the present descriptor uses a scale space and a different size of patch according to the octave in which the feature point was found, thus rendering the descriptor invariant to scale.

A further process called Pcrf provides an improvement of the descriptor which enables it to become more distinctive. In PCRF the patch around the feature point is divided into 5 overlapping patches, as shown in FIG. 9. Each overlapping patch is described as a vector and may be projected into a 4-dimensional space. The vectors are then being concatenated into the 20-vector descriptor.

Referring again to FIG. 5, we now consider in greater detail the processing of the query image. As will be recalled, there are separate procedures when the query image is from printed matter and when it is a digital image.

In the case of the printed image, there are stages of cleaning and dividing into sub-images, and here is a stage of cleaning periodic noise such as artifacts of printing and scanning. The probes are scanned magazines, newspapers or books.

Due to the scanning and printing processes, there is periodic noise that interferes with the comparison process. Periodic noise may be removed using the following procedure. A fast Fourier transform (FFT) of the image is created, and some noise removal takes place, for example high frequencies may be eliminated. An inverse FFT is then carried out. The overall effect is to remove periodic noise due to scanning and printing.

Figure 10:
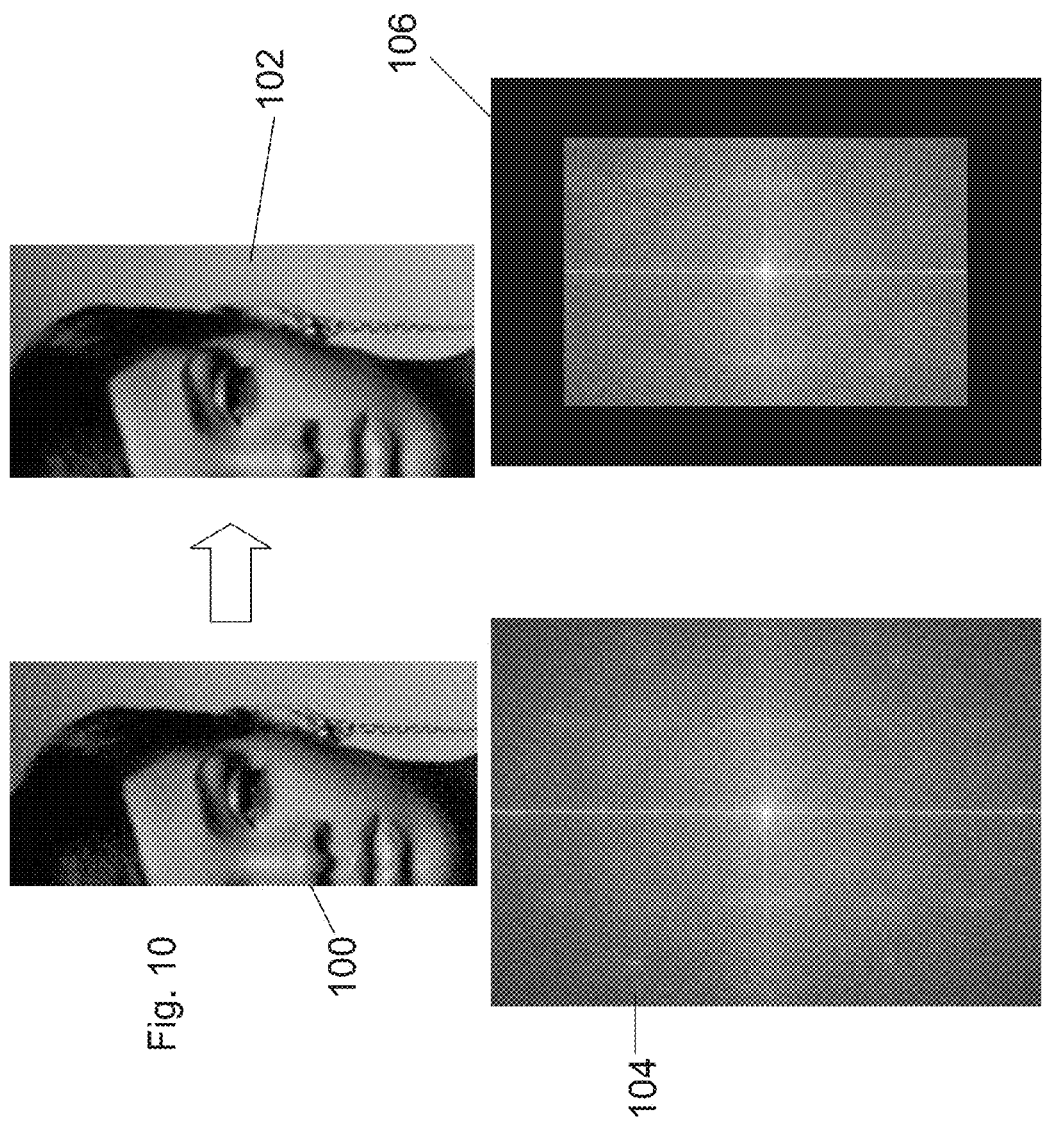

Reference is now made to FIG. 10 which illustrates an original printed image 100 with printing pixels clearly visible. Resulting image 102 has the printing pixels removed. Image 104 is the FFT of 100, and image 106 is the FFT with the peaks removed.

Create Text Vs. Image Mask

Another problem is that the magazine, newspaper or book probes contain areas of text and graphics that are irrelevant to image matching but which attract the attention of the feature detector. This is at the cost of coverage of important regions and features of the images.

Reference is now made to FIG. 11. Using the SVM that was trained in advance, it is possible to decide for each patch whether it is a text patch or an image patch. Hence a mask may be set over the image which is 0 on test/graphic regions and 1 on continuous-tone image regions. Newsprint page 110 is covered with a mask to provide masked page of newsprint 112, in which the mask retains the image material and covers the text material.

Division into Subimages

By identifying connected components in the mask and by detecting strong vertical & horizontal edges it is possible to divide the magazine page into the relevant subimages and continue the process with them. FIG. 12 illustrates a page of newsprint in which four sub-images have been identified.

Returning again to FIG. 5, and in the case of digital images the first stage is to remove the margin. This requires recognizing the real region of the image. If the image is surrounded by a smooth area then the smooth area may be recognized by checking the statistics of the image intensities and edges. Once recognized this margin can be removed. Thus we deal only with the relevant area.

A stage then follows of eliminating irrelevant probes. The stage removes query images that contain mainly text, logos or blank areas. This is done in a similar way to detection of text areas in the printed matter system.

The image may be enlarged if necessary. Without enlargement it may not be possible to catch meaningful features in the image.

Enrolling the query image is similar to the enrollment process of the catalogue image except for the following change in the printed matter system. Each subprobe is separately enrolled. Features on areas of text are ignored and the system finds more than N points. This is done in order to increase the chances of finding a match Comparison The present embodiments may support cropping. Thus each image is described with an unordered set of local feature descriptors. The possibility that the query image is a part of the image being matched means there is a requirement to support partial matching, that is to say correspondence is found if the query image matches with a part of the image being matched. Such a comparison process is lengthy since technically each feature should be compared to each feature in all the images and all the partial matchings should be considered—in order to find the best match.

When searching for a match only a subset of the images in the catalogue is chosen for comparison in order to find candidate to move to the next stage, in which a longer computation is being done.

Finding Possible Candidates

In a first phase of the comparison, the comparator finds initial candidate images from the catalogue. The stage chooses the images that have at least N descriptors whose distance to the probe's descriptors is small and add it to a list of candidates, N being for example 3.

The process involves loading features into a features space table/kd-tree. FIG. 13 shows a non-uniform distribution of features in a feature space 130, and the representation as a kd tree 132 of part of that space.

The stage either loads feature descriptors of a batch of catalogue images into the feature-space quantized table. The features are hashed in the table according to their first 4 coordinates, or they are loaded into a kd-tree. This data structure enables to find efficiently nearest neighbours (NN) in a high-dimensional features space.

A stage follows of voting for images with close features. For each probe's descriptor—the comparator checks in its close vicinity for descriptors of a catalogue image. If found then a vote is added for such an image. An image with 2-3 votes is a candidate and moves on to the next phase, after being added to the candidate list.

When loaded into a table all descriptors are checked in a cube around the probe's descriptor and a vote is given for each image whose descriptor distance is lower than a certain radius. It is noted that a descriptor is considered to be close only if the second closest descriptor is far enough away.

In the case of the kd-tree data structure, the ANN (Approximate Nearest Neighbor algorithm) may allow efficient identification of x closest neighbors and may raise their image vote. Note that here there is voting only for a predefined number of neighbors and thus the number of candidates that need to be checked in the next stage is limited. It turns out that the correct match can be found by checking only for such a subset of candidates.

The kd-tree 132 divides the high-dimensional features-space 130 in a non-uniform way such that each cell contains a fixed number of points and enables an efficient search of k-Nearest neighbors.

Calculating Similarity of the Candidates

For each candidate image—one may compare all descriptors with the probe descriptors and may count how many close pairs there are. In fact, in this stage one may enable a slightly bigger distance. An image with more than 4-5 descriptors indicated as similar may be allowed to move to the next phase. The distance used is the Euclidean distance. For optimization we simulate a table of the probes' descriptors and look for close catalogue descriptors only in the relevant area around them. Such optimization may be achieved using a bitmap table which holds the probe's descriptors.

Verification

The verification stage verifies the proposed matches by calculating the transformation between the matched images and by using a variation of template matching.

The transformation is calculated for example using RANSAC, as mentioned above.

RANSAC looks for an x/y-scale+translation transformation with 4 degrees of freedom-2 points—between the matched images. The algorithm look for a consistent model with enough supporting inliers.

For the printed query image there is a massive use of rotation, so the transformation may also enable rotation in the z-plane, thus 5 degrees of freedom and 3 points may be used. The process is much longer and constraints may be added over the transformation.

Fast Template Matching ("Hamming Distance")

In the verification stage the calculated transformation may applied in order to align the images and then one can check for template matching. If the score is high enough then the match is verified. Instead of using correlation an alternative is to use a variant of hamming distance. 1000 points may be sampled and then checked to see whether their ratio in both images is the same. This verification is faster and invariant to illumination and color changes.

Advanced False Match Elimination

Empirically we found 3 tests which enable us to identify false matches by checking the location of the inliers, as follows.

Small region—If all inliers are located on a very small region there is a big chance it is a false match.

Same ridge/edge—The same holds when all inliers are located on the same edge (or ridge).

A third test, particularly appropriate for print sources was to exclude cases where all inliers were not on skin regions. The concept is illustrated in FIG. 14. Since print applications are concerned with news, sport and entertainment monitoring—most of the matches contain people—and their faces or body, as shown in newspaper sheet 140. Skin regions in the catalogue image may be detected as described below, given that the skin areas provide a certain range of color and texture. If none of the inliers is on a skin area—it is a false match. The computation produces a skin mask that retains only the skin areas as in 142. The computation may be as follows:

$L(x)=105\text{Log}(x+1+\text{noise}), I=L(G), Rg=L(R)-L(G),$
$By=L(B)-(L(G)+L(R))/2$ $\text{Texture}=\text{med}(|I-\text{med}(I)|), \text{Hue}=a\tan(Rg, By), \text{Saturation}=\sqrt{Rg^2+By^2}$ $\text{Skinmask}=(\text{texture}<5,110<\text{hue}<150, 20<\text{saturation}<60) \text{ OR } (\text{texture}<5,130<\text{hue}<170, 30<\text{saturation}<130)$

EXAMPLE 1

The following describes a specific configuration, given a very large-scale catalogue and a query image—to rapidly return a similar image to the query from the catalogue, if exists. The image is similar except for scale and compression. New PCA training is needed.

Offline

The first part of the process concerns the offline training part. Initially a pca basis is obtained that is to say we find the basis for very long input vectors One of the configurations is to use patches of 100*100. A sample vector to be projected is 10000 long. Performing PCA directly on the covariance matrix of the samples is computationally unfeasible. In order to avoid such computation, we proceed as follows.

Let T be the matrix of preprocessed training examples, where each row contains one mean-subtracted image. The covariance matrix can then be computed as $S=T^TT$ and the eigenvector decomposition of S is given by $Sv_i=T^TTv_i=\lambda_i v_i$. However $T^TT$ is a large matrix, so instead we take the eigen value decomposition of $TT^Tu_i=\lambda_i T^Tu_i$. We notice that by pre-multiplying both sides of the equation with $T^T$, we obtain $T^TTT^Tu_i=\lambda_i T^Tu_i$, meaning that, if $u_i$ is an eigenvector of $TT^T$, then $v_i=T^Tu_i$ is an eigenvector of S. If we have a training set of 200 images of 100×100 pixels, the matrix $TT^T$ is a 200×200 matrix, which is much more manageable than the 10000×10000 covariance matrix.

The above has used the fact that the number of training examples is smaller than the dimensionality of the images and has made some algebra manipulations, thus computing the principal components.

The catalogue images are enrolled and stored in an efficient data structure. Since we do not enable cropping and changes in the image plane—we use a global descriptor. It is computed as follows:

The image is resized into 100*100, so as to be invariant to scale. Intensity values of the patch (10000d-vecror) are projected into the 20-PCA space.

An image mean value is found, for example by computing the image dc component, which is the average value of its gray level intensities.

Each image is thus described by its dc component and the 20-vector.

The descriptions are placed in a data structure which enables efficient search.

The catalogue images are divided into batches according to their dc-values. The dc values are typically allowed to range between 0-255. These batches are overlapping. Thus for example a first batch may consist of images with dc 0-12, the second 10-22 and so on.

A kd-tree is constructed for each batch of catalogue images. The kd tree then holds their descriptors. As mentioned, this data-structure enables efficient search of the closest neighbor in high-dimensional space.

Query

Given a query image, then as discussed before the first stage involves enrolling the query image The enrollment process is similar to the enrollment of the catalogue image discussed hereinabove. The result of the process is a 20 long vector descriptor+dc component.

The query is then indexed to a suitable tree. The dc value of the query image may be used to find the relevant tree to search for the closest neighbor. We note that since we find that similar scale or compressed images have similar dc values, to an accuracy of 1-2, and since we have created overlapping batches, it is possible to send the query to a single tree and be sure that its similar image will be found there.

Find x closest neighbors

In the kd-tree in a predefined radius we search efficiently for x closest neighbors. If such neighbors exist, there is a high chance that one of them is the descriptor of an image from the catalogue which is near exact, up to scale, to the query image.

Having found candidate matches in the previous stage these may now be loaded from the catalogue alongside the query image. A Hamming distance template matching is carried out by checking areas with high magnitude. The image with the best score, if it is above a predefined threshold—is the correct match.

EXAMPLE 2

A second example attempt to achieve a large-scale, fast and efficient search, and also support distortions such as cropping, illumination changing, noise, etc.

As mentioned, when supporting cropping each image may be described with an unordered set feature descriptors and partial matching between the two images. Such a process is lengthy, since technically each feature may be compared to each feature in all the images and all the partial matchings may be considered.

We try to optimize that search using stages, each stage checking a different batch from the catalogue.

The example finds a subset of the whole catalogue images which is relevant, as will be explained. The example further enables comparison between each feature point and only a small subset of other features.

The set of local features may be described as a global vector, and enhance the comparison and enable clustering or other learning processes.

Three approaches for achieving the above, pyramid matching, LSH, ANN, Bag of Features and database sorting are now discussed.

1. Pyramid Matching—

A global description proposed by Kristen Grauman for a set of unordered features is a multi-resolution histogram, which uses increasing size of bin at each level, and a distance measure (histogram intersection) which enable us to compute an approximation of the optimal partial matching in linear time in the number of features * which is the dimension of the vector.

Moreover, the global description allows for classifying or object recognition, clustering or category discovery, and nearest neighbor finding, that is the retrieval of the similar image candidate. It also indexes over a set of correspondences and carries out the comparison to a small subset which appears the most relevant. A consequence is that the search is not a linear search.

The assumption is that a probe is present in the catalogue. We check if there is a problem when the probe is a composite from several catalogue images. The histogram and the histogram intersection are computed as efficiently as possible.

FIG. 15 illustrates two histograms based on two different images which are similar but are not matches.

2. LSH—

LSH is an algorithm which finds a nearest neighbor in an high-dimensional space efficiently. The algorithm uses hashing so it may be implemented efficiently using a database. The database is reliable and may hold a huge quantity of descriptors of images—so comparisons may be carried out against a large number of images at once. The main idea is to project the features from the high-dimensional feature space into one-dimensional spaces such that a nearest neighbor in a high space may be a nearest neighbor in one of the lower spaces. The 1-dimensional space may be divided into bins, that is hashed—and nearest neighbors may thus be easily discovered.

3. ANN—

In order to become more efficient we may use the kd-tree to restore the catalogue image descriptors instead of a table. A Distributed Cache may hold all the data. Alternatively the tree may be divided into other smaller trees and each probe descriptor may be sent only to the relevant subtree. Such a relevant subtree may be identified using the first coordinate, or using other information such as the dc level of the patch.

The kd-tree structure may be implemented within a database, thus making it more reliable and cheaper.

4. Bags of Features

The bag of features family of methods are based on transforming the set of real-valued feature vectors coming from one image into a single flat histogram that counts the frequency of occurrence of some number of pre-defined or quantized feature prototypes. In this way the quantized feature space provides a visual vocabulary or bag-of-words vector representation.

The main purpose of this family of methods is for categorization tasks, for example for recognition. The main advantages of such methods are that again we describe the image with local descriptors. Such is a flexible description which enables cropping but in a compact and global way.

In order to ensure that the method describes images in a way that is specific enough for recognition a distance measure is used which considers two histograms in which one is contained in the other, as similar, thus to enable partial matching. Such a distance measure is illustrated with the optimal partial matching of FIG. 15 referred to above.

5. Find a Subset of Relevant Images Using Database

A fifth approach involves creating a sorted database. The database is sorted by each coordinate, giving 20 different sorts for a 20-dimensional vector. For each probe' descriptor, the method finds its closest neighbors using L1 distance. Finding an L1 can be done quite easily with a sorted database—simply look for descriptors whose $1^{st}$ coordinate is equal +− the radius to the $1^{st}$ coordinate of the probe's descriptor and the $2^{nd}$ coordinate is equal and so on . . . . Then a vote is given for the catalogue images whose descriptor was close to the probe' descriptor. By the end of the process a subset of the large catalogue images is obtained as a candidate set. The candidates are relevant for comparison with the current query.

FIG. 16 illustrates features matching between a cropped image and a larger source image.

FIG. 17 illustrates a further example of feature matching to find a source image for a cropped image. In FIG. 17 the images are negatives but the cropped image is again recognized as the source image.

It is appreciated that certain features of the invention, which are, for clarity, described in the context of separate embodiments, may also be provided in combination in a single embodiment. Conversely, various features of the invention, which, for brevity, are described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

We claim:

1. A method of analyzing a digital image to determine an unordered local descriptor describing the digital image, the method comprising:
   selecting a subset of feature points within multiple local extrema,
      wherein each feature point has an associated blur level and scale octave;
   creating a vector for each of the feature points, each feature point vector based on the normalized intensity values of a patch around the feature point,
      wherein the patch size is determined by the associated octave;
   dividing the patch into multiple overlapping patches,
      wherein each overlapping patch is represented by a vector;
   concatenating each overlapping patch vector by projecting the multiple overlapping patch vectors onto an eigen space; and
   creating an unordered local descriptor for the digital image,
      wherein the unordered local descriptor is a compact representation of feature points defining the digital image, and
      wherein the compact representation is a multi-vector descriptor formed from the concatenated patch vectors.

2. The method of claim 1, further comprising:
   generating a scale-space pyramid configured from a series of blur levels and scale octaves of the digital image; and
   localizing multiple local extrema in the scale-space pyramid, wherein the multiple local extrema are greater than a predetermined intensity, and
      wherein dividing the patch into multiple overlapping patches includes dividing the patch into five or more overlapping patches.

3. The method of claim 1, wherein each descriptor uses a scale space determined by the associated octave.

4. The method of claim 3, wherein each descriptor is invariant to scale.

5. The method of claim 1, wherein the patch is re-sized to a constant size.

6. The method of claim 1, further comprising:
   constructing a hyperplane to provide a line of demarcation between a first region and second region,
   wherein the demarcation line is determined by edge distributions of the first region and the second region, each of the first and second region differing in intensity; and
   defining the digital image to be analyzed based on the demarcation line.

7. The method claim 6, wherein the first region is a continuous tone region and the second region is a graphics region.

8. The method of claim 6, wherein the hyperplane includes a set of hyperplanes.

9. The method of claim 6, defining a functional margin measured by a distance between the constructed hyperplane and a nearest feature point defined in the digital image.

10. The method of claim 1, wherein the descriptor is resilient to distortions in a digital image plane.

11. The method of claim 1, further comprising determining an orthogonal coordinate system based on the largest variance between each feature point vector.

12. The method of claim 1, further comprising: generating a catalog of images, each image having an associated unordered local descriptor.

13. A non-transitory computer readable medium including instructions that when performed by a processor perform a method comprising:
   selecting a subset of feature points within multiple local extrema,
      wherein each feature point has an associated blur level and scale octave;
   creating a vector for each of the feature points,
      wherein the vector is based on the normalized intensity values of a patch around the feature point, wherein the patch size is determined by the associated octave;
   dividing the patch into multiple overlapping patches,
      wherein each overlapping patch is represented by a vector;
   concatenating each overlapping patch vector by projecting the overlapping patches onto an eigen space; and
   creating a compact representation of feature points defining the digital image,
      wherein the compact representation is a multi-vector descriptor formed from the concatenated patch vectors.

14. The non-transitory computer readable medium of claim 13, the method further comprising:
   generating a scale-space pyramid, the scale-spaced pyramid configured from a series of blur levels and scale octaves of the digital image; and
   localizing multiple local extrema in the scale-space pyramid,
      wherein the multiple local extrema are greater than a predetermined intensity, and
      wherein dividing the patch into multiple overlapping patches includes dividing the patch into five or more overlapping patches.

15. The method of claim 13, wherein each descriptor is invariant to scale.

16. The method of claim 13, wherein the patch is re-sized to a constant size.

17. The method of claim 13, wherein the descriptor is resilient to distortions in a digital image plane.

18. The method of claim 13, further comprising: determining an orthogonal coordinate system based on the largest variance between each feature point vector.

19. The method of claim 13, further comprising: generating a catalog of images, each image having an associated unordered local descriptor.

20. A system of analyzing a digital image to determine an unordered local descriptor describing the digital image, the system comprising:

means for selecting a subset of feature points within multiple local extrema,
      wherein each feature point has an associated blur level and scale octave;
   means for creating a vector for each of the feature points, the vector based on the normalized intensity values of a patch around the feature point,
      wherein the patch size is determined by the associated octave;
   means for dividing the patch into multiple overlapping patches,
      wherein each overlapping patch is represented by a vector;
   means for concatenating each overlapping patch vector by projecting the overlapping patch vectors onto an eigen space; and
   means for creating an unordered local descriptor for the digital image,
      wherein the descriptor is a compact representation of feature points defining the digital image, and
      wherein the compact representation is a multi-vector descriptor formed from the concatenated patch vectors.

* * * * *

UNITED STATES PATENT AND TRADEMARK OFFICE
CERTIFICATE OF CORRECTION

PATENT NO. : 9,135,518 B2
APPLICATION NO. : 13/943705
DATED : September 15, 2015
INVENTOR(S) : Gutelzon et al.

It is certified that error appears in the above-identified patent and that said Letters Patent is hereby corrected as shown below:

On the title page, item (71), in column 1, in "Applicant", line 1, delete "Herzlia" and insert -- Herzliya --, therefor.

On the title page, item (72), in "Inventors", line 1, delete "Herzlia" and insert -- Herzliya --, therefor.

On the title page, item (73), delete "Herzlia" and insert -- Herzliya --, therefor.

In the specification

In column 1, line 53, delete "purposes" and insert -- purposes. --, therefor.

In column 5, line 56, delete "sintended" and insert -- is intended --, therefor.

In column 7, line 36, delete "descriptors" and insert -- descriptors. --, therefor.

In column 10, line 40, delete "match" and insert -- match. --, therefor.

In column 12, line 36, delete "vectors" and insert -- vectors. --, therefor.

In column 12, line 63, delete "(10000d-vecror)" and insert -- (10000d-vector) --, therefor.

In column 13, line 17, delete "image" and insert -- image. --, therefor.

In the claims

In column 16, line 18, in claim 7, after "method" insert -- of --.

Signed and Sealed this
First Day of March, 2016

Michelle K. Lee
*Director of the United States Patent and Trademark Office*